US010317684B1

(12) United States Patent
Lee (10) Patent No.: US 10,317,684 B1
(45) Date of Patent: Jun. 11, 2019

(54) OPTICAL PROJECTOR WITH ON AXIS HOLOGRAM AND MULTIPLE BEAM SPLITTER (71) Applicant: K Laser Technology, Inc., Hsinchu (TW)

(72) Inventor: Wai-Hon Lee, Los Altos, CA (US)

(73) Assignee: K Laser Technology, Inc., Hsinchu (TW)

( * ) Notice: Subject to any disclaimer, the term of this patent is extended or adjusted under 35 U.S.C. 154(b) by 0 days.

(21) Appl. No.: 15/879,367

(22) Filed: Jan. 24, 2018

(51) Int. Cl.
G02B 3/00 (2006.01)
G02B 5/32 (2006.01)
G01B 11/25 (2006.01)
G02B 27/10 (2006.01)
G02B 27/42 (2006.01)
G06T 7/521 (2017.01)

(52) U.S. Cl.
CPC .......... G02B 27/1093 (2013.01); G01B 11/25 (2013.01); G02B 5/32 (2013.01); G02B 27/106 (2013.01); G02B 27/425 (2013.01); G06T 7/521 (2017.01); *G02B 3/0006* (2013.01)

(58) Field of Classification Search
CPC .......... G02B 27/0037; G02B 27/0043; G02B 27/0944; G02B 27/1086; G02B 27/1093; G02B 27/60; G02B 27/106; G02B 5/32; G02B 3/0006; G06T 7/521
See application file for complete search history.

(56) References Cited

U.S. PATENT DOCUMENTS

| 6,188,062 | B1 | 2/2001 | Lee |
| 7,699,516 | B1 | 4/2010 | Lee |
| 2008/0240502 | A1 | 10/2008 | Freedman et al. |
| 2009/0185274 | A1 | 7/2009 | Shpunt |
| 2010/0007717 | A1 | 1/2010 | Specktor et al. |
| 2011/0075259 | A1 | 3/2011 | Shpunt |
| 2013/0038881 | A1* | 2/2013 | Pesach ............ G01B 11/25 356/610 |
| 2013/0170004 | A1 | 7/2013 | Futterer |

(Continued)

FOREIGN PATENT DOCUMENTS

| WO | 2007043036 A1 | 4/2007 |
| WO | 2007105205 A2 | 9/2007 |
| WO | 2008120217 A2 | 10/2008 |

OTHER PUBLICATIONS

Spagnolo, Diffractive optical element-based profilometer for surface inspection, 2001, Opt. Eng. 40(1), pp. 44-52 (Year: 2001).*

(Continued)

*Primary Examiner* — Kimberly N. Kakalec
(74) *Attorney, Agent, or Firm* — Kilpatrick Townsend & Stockton LLP (57) ABSTRACT

In one embodiment, the light from a single laser is used to illuminate a pattern-generating optical element to generate a pattern. The pattern-generating optical element in various embodiments can be, for example, a holographic diffractive optical element (DOE) or an array of micro-lenses. A multiple beam grating (MBG) duplicates the pattern multiple times to provide a multiple pattern image. A lens is used to project the patterns onto an object. In one embodiment, the lens is located between the pattern-generating optical element and the multiple beam grating (MBG).

20 Claims, 11 Drawing Sheets (56) References Cited

U.S. PATENT DOCUMENTS

| | | | |
|---|---|---|---|
| 2014/0307307 A1 | 10/2014 | Georgiou et al. | |
| 2014/0376092 A1 | 12/2014 | Mor | |
| 2015/0253123 A1* | 9/2015 | Braker | G01B 11/002 356/610 |
| 2016/0025993 A1* | 1/2016 | Mor | G02B 27/4205 362/259 |
| 2016/0223724 A1* | 8/2016 | Hudman | G01B 11/2513 |
| 2016/0265906 A1* | 9/2016 | Yamashita | G01B 11/2513 |
| 2016/0309135 A1* | 10/2016 | Ovsiannikov | H04N 5/23245 |
| 2017/0287151 A1* | 10/2017 | Han | G06T 7/521 |

OTHER PUBLICATIONS

Wai-Hon Lee, "Computer-Generated Holograms: Techniques and Applications," Progress in Optics,1978, pp. 121-232, vol. XVI, edited by E.Wolf, North-Holland Publishing Company, Amsterdam New York Oxford.

Wai-Hon Lee, "High Efficiency Multiple Beams Gratings," Applied Optics, Jul. 1, 1979, pp. 2152-2158, vol. 18, Optical Society of America.

"Apple VSCEL supplier suggests TrueDepth coming to multiple iPhones this fall." Retrieved on Jun. 28, 2018. Retrieved from the Internet: https://appleinsider.com/articles/18/03/08/apple-vcsel-supplier-suggests-truedepth-coming-to-multiple-iphones-this-fall_ 11 pages.

"Lumentum Has Leg Up on Finisar in First iPhone X Units, Say Piper, Raymond James." Retrieved on Jun. 28, 2018. Retrieved from the Internet: https://www.barrons.com/articles/lumentum-has-leg-up-on-finisar-in-first-iphone-x-units-say-piper-raymond-james-1505328034_3 pages.

* cited by examiner

OPTICAL PROJECTOR WITH ON AXIS HOLOGRAM AND MULTIPLE BEAM SPLITTER

BACKGROUND OF THE INVENTION

The present invention relates to optical projection using diffraction for uses such as three dimensional (3D) surface measurements for facial recognition or other purposes.

Optical projection of a pattern is used in applications such as 3D surface measurements. The positions of a pattern of dots caused by beams projected onto a flat surface can be determined. When the same pattern of dots is projected on a 3D surface to be measured, the positions of the dots will deviate from their designed positions as a result of the different intersection height on the 3D surface. These deviations can be measured and correlated to the different distances, or depth, of the 3D surface, and a 3D image can be generated.

Miniature optical projectors are used to do such 3D mapping (also known as depth mapping). U.S. Patent Application Publication 2008/0240502 uses a light source (e.g., laser diode or LED) to illuminate a pattern on a transparency and project the pattern onto the object. An image detector then captures an image of the pattern that is projected onto the object. In one version, as described in International Publication WO 2008/120217, an array of micro-lenses is placed behind the transparency pattern to improve the signal contrast of the projected pattern.

In order to put an optical projector into a smartphone, it needs to be very miniaturized. One approach investigated was to use a single laser beam and a diffractive optical element (DOE) to produce a dot pattern. But in order to generate a pattern with enough dots, the ratio of the $0^{th}$ order beam to the diffracted beams was too large. For measurements of a user's face, a large 0 order beam is not acceptable because of the potential damage to the user's eyes.

Prime Sense realized that if they divide the laser beam into M beams and use M DOEs the ratio between the $0^{th}$ order beam and the diffracted beams can be minimized by factor of M. This approach is described in U.S. Patent Application Publication 2009/0185274, and uses two diffractive optical elements (DOEs). In one embodiment, the first DOE acts as a beam-splitter which splits the emitted beam into a multiple beams, and the second DOE serves as a pattern generator to form a diffraction pattern on each of the beams. A design issue is that it take space to separate the M beams so that they can illuminate M DOEs. This limits how much the optical projector can be miniaturized.

To provide further miniaturization, Prime Sense U.S. Patent Application Publication 20140376092 uses another approach, with a VCSEL array of laser emitters to produce a pattern, instead of using a single laser. A lens projects the non-collimated pattern to a single DOE which is used to produce multiple replicas of the pattern.

Figure 1:
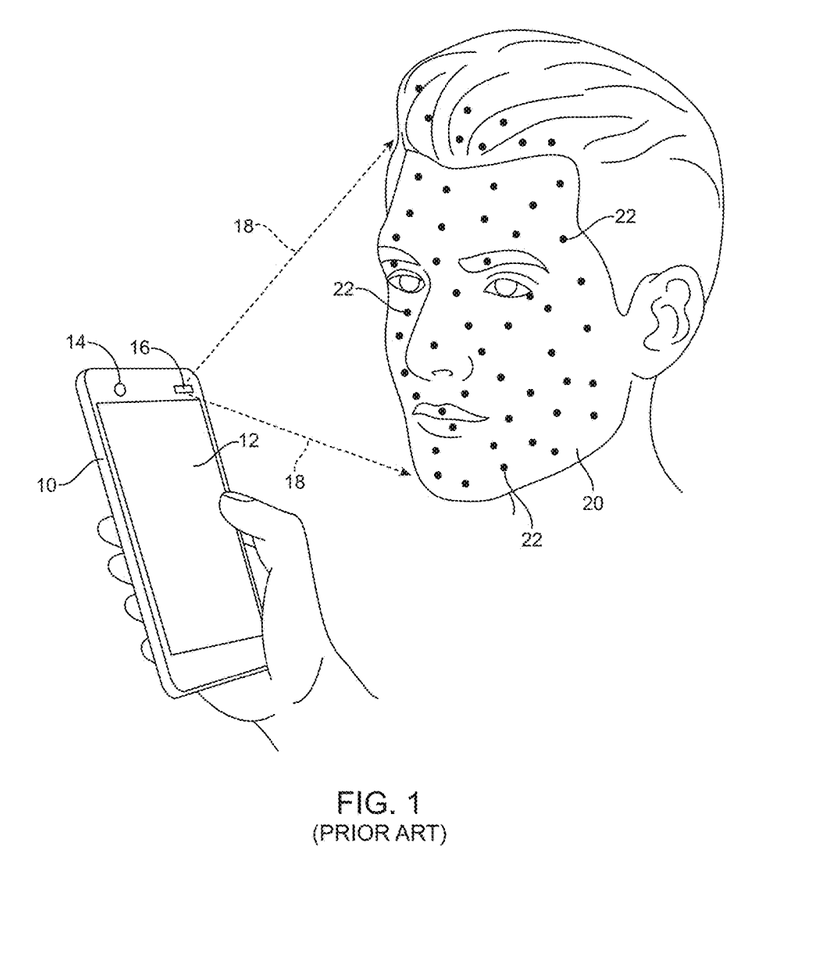
FIG. 1 is a diagram of a prior art optical projector in a smartphone.

FIG. 1 shows an example application of a miniaturized optical projector for depth measurements. A smartphone 10 includes a display 12, a camera 14 and an internal processor and other electronics. Display 12 can be used for presenting information to a user, and also functions as a touch screen for inputting information. An optical projector/detector module 16 is provided. Projector/detector module 16 projects an IR image which diverges as shown by arrows 18. The IR image is projected onto a user's face 20 as a series of dots 22. A detector in optical projector/detector module 16 then detects the dots 22, and from their relative positions, can determine the depth of the various parts of the user's face 20. By combining this with traditional two dimensional facial recognition, a user's face can be detected with great accuracy.

Figure 2:
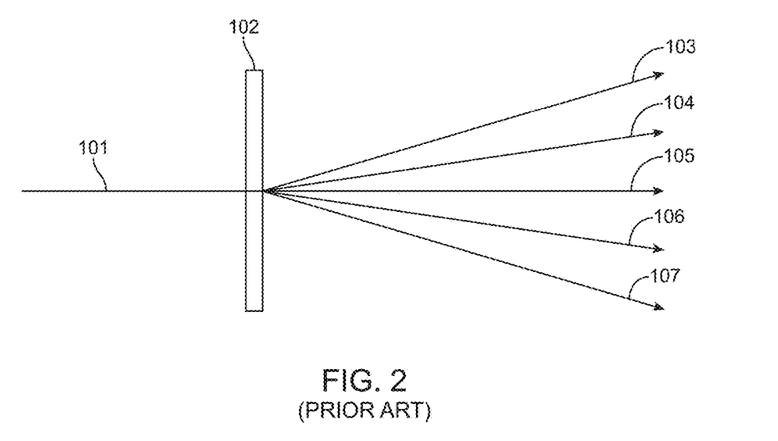
FIG. 2 is a diagram illustrating a prior art multiple beam grating.

FIG. 2 illustrates how a diffraction grating, known in the prior art, provides multiple beams that can form a pattern, such as a series of dots. A laser beam 101 is incident on the diffraction grating 102. Beam 101 is diffracted into a series of beams, such as beams 103, 104, 105, 106 and 107 as shown emerging from grating 102. The diffracted beams are described by diffraction order, with the 0 order (beam 105) being straight on the path of the original beam, then $1^{st}$ order beams on each side of a one dimensional grating, then the $2^{nd}$ order beams, etc. There would typically be additional diffraction orders beyond what is shown in FIG. 2. However, the intensities of beams beyond the first few orders are generally relatively weak. Most of the laser energy is distributed among the 5 major beams. Since the purpose of this particular diffraction grating is to divide a single laser beam into multiple beams, it is sometimes called a multiple beam grating (MBG).

Figure 3:
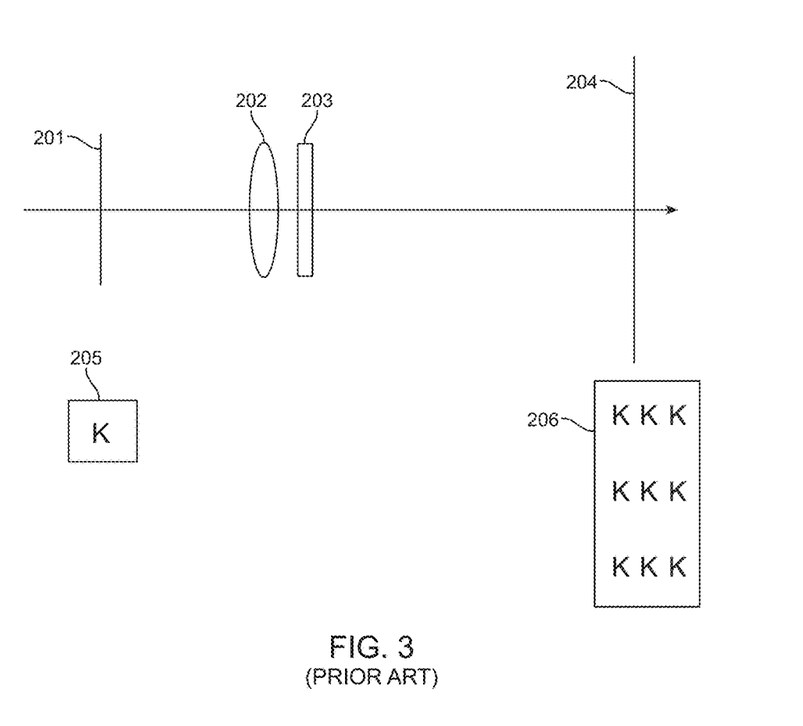
FIG. 3 is a diagram illustrating how a prior art multiple beam grating can be used to multiply the image of an object into an array of images.

FIG. 3 illustrates one example of how a prior art multiple beam grating (MBG) is used. An object 201 is placed in front of lens 202. Lens 202 projects an image of the object 201 to a plane 204. A multiple beam grating 203 is placed after lens 202. Grating 203 creates multiple images of the input object 201 at plane 204. If the object is the form of a "K" (205), grating 203 will duplicate this to provide a projection of 9 K images 206 as shown. This is the principle used in U.S. Patent Application Publication 2014/0376092, referenced above, to project dot patterns for 3D pattern recognition.

Figure 4:
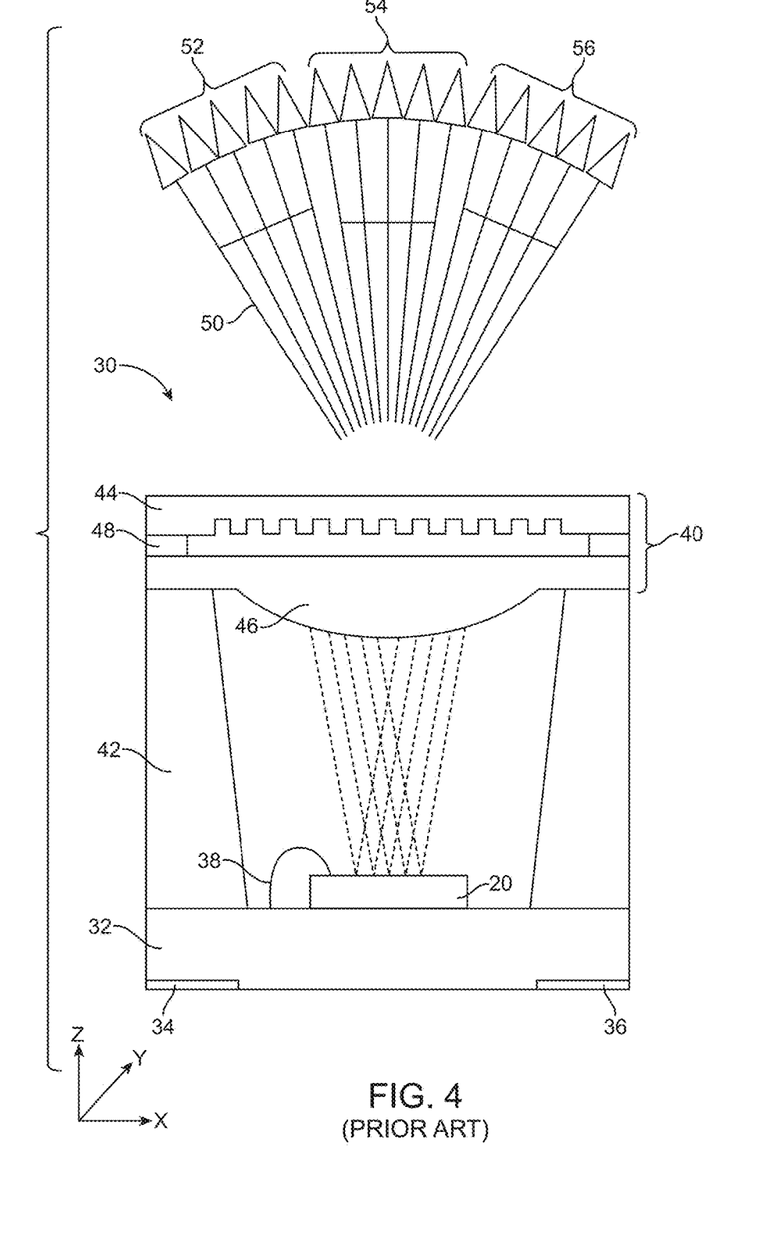
FIG. 4 is a diagram illustrating a prior art use of a multiple beam grating.

FIG. 4 is from U.S. Patent Application Publication 2014/0376092. An array of vertical cavity surface emitting lasers (VCSEL) 20 is placed in front of a lens 46. On top of the lens 46 is a multiple beam grating (MBG) 44. This integrated module is able to project multiple images of the VCSEL array into space to illuminate the object for 3D recognition. An integrated optical projection module 30 contains the VCSEL array 20. VCSEL die 22 is mounted on a sub-mount 32, with appropriate electrical connections 34, 36, 38. Optics 40, including projection lens 46, are mounted over the die on suitable spacers 42. Lens 46 collects and projects an output beam 50 of the VCSEL emitters. A multiple beam grating (MBG) 44, supported by thin spacers 48, creates multiple replicas 52, 54, 56 of the pattern of the lines of the VCSEL array, fanning out over a predefined angular range.

It is desirable to have an improved optical projection module which is both miniaturized and more economical to manufacture.

BRIEF SUMMARY OF THE INVENTION

In one embodiment, the light from a single laser is used to illuminate a pattern-generating optical element to generate a pattern. The pattern-generating optical element in various embodiments can be, for example, a holographic diffractive optical element (DOE) or an array of micro-lenses. A multiple beam grating (MBG) duplicates the pattern multiple times to provide a multiple pattern image. A lens is used to project the patterns onto an object. In one embodiment, the lens is located between the pattern-generating optical element and the beam-splitter DOE.

In one embodiment, the pattern-generating optical element is a holographic diffractive optical element which is created using a Fourier transform hologram to produce a dot pattern. The dot pattern appears to originate from a plane around the laser emitting point, and thus it can be said that they are virtual images of the laser emitting point. The multiple beam grating (MBG) splits the dot pattern image using a diffraction method which maintains the substantially equal intensity of each duplicated pattern. In particular, the multiple beam grating (MBG) is a phase grating with, for example, pulse width modulation (PWM) or pulse position modulation (PPM). The lens projects the duplicated pattern onto an object to be measured, such as a person's face.

In one embodiment, an optical projector module is provided with a DOE, a lens and a multiple beam grating (MBG). An alternate embodiment uses a mirror between the DOE and the lens. Yet another alternate embodiment uses a reflective DOE. Another alternate embodiment uses an array of micro-lenses in place of a DOE.

DETAILED DESCRIPTION OF THE INVENTION

Figure 5:
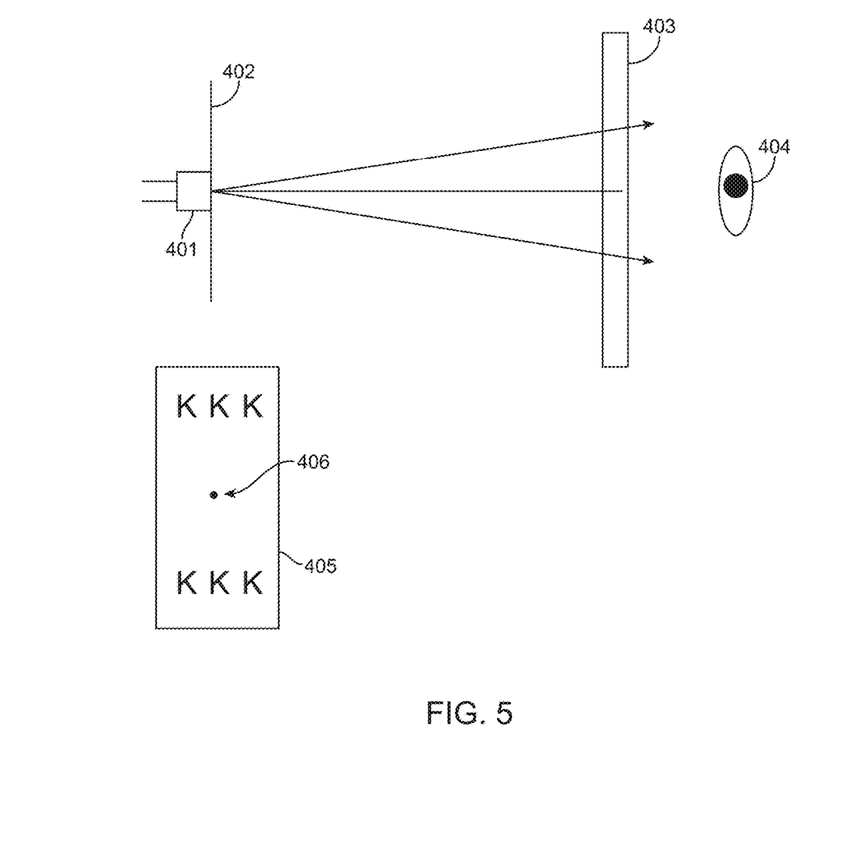
FIG. 5 is a diagram illustrating a DOE creating a virtual image multiplied into an array of images with a lens and multiple beam combination.

FIG. 5 is a diagram illustrating a DOE creating a virtual image multiplied into an array of images with a lens and multiple beam combination. In FIG. 5 an edge emitting laser 401 is shown to illuminate a DOE 403. As observed by a user's eye 404 looking toward laser 401, this produces a virtual image 405 at a plane 402. which is designed to generate a virtual image 405 at plane 402. Point 406 is the emitting point of the laser 401 as seen by eye 404 when hologram 403 cannot suppress its 0th order beam. Although the image is a pattern of multiple letters "K," any other image can be used which a DOE can generate, such as a pattern of dots.

Figure 6:
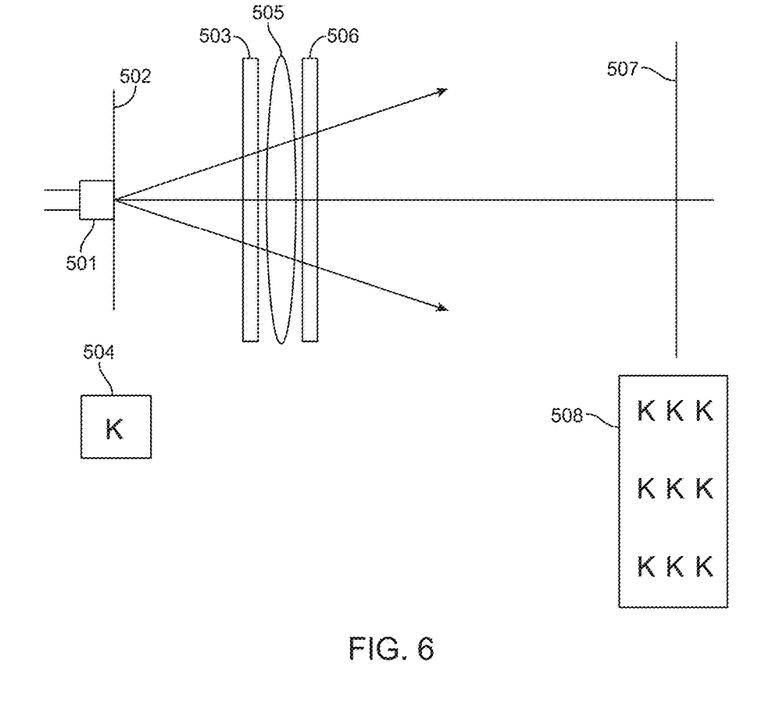
FIG. 6 is a diagram illustrating an embodiment of the present invention with a DOE, a lens and a beam splitter.

FIG. 6 is a diagram illustrating an embodiment of the present invention with a DOE, a lens and a beam splitter. This produces a very compact optical projector for use in devices such as a smart phone. An edge emitting laser 501 illuminates a DOE 503. The distance between the laser 501 and the DOE 503 can be adjusted to change the size of the virtual image from DOE (hologram) 503, which can be seen on plane 502. Pattern 504 ("K") represents the virtual image of a hologram at plane 502. An imaging lens 505 projects the image pattern through a multiple beam grating (MBG) 506, with the image pattern appearing at an image plane 507 of lens 505. The pattern is duplicated after passing through the multiple beam grating, as illustrated by pattern 508, which produces duplications of the letter K on image plane 507. Due to the use of the multiple beam grating (MBG), the number of dots recorded in the hologram becomes fewer and the coverage angle by the dots is smaller. This makes it possible to make a hologram which can have a relatively weaker $0^{th}$ order.

Figure 7:
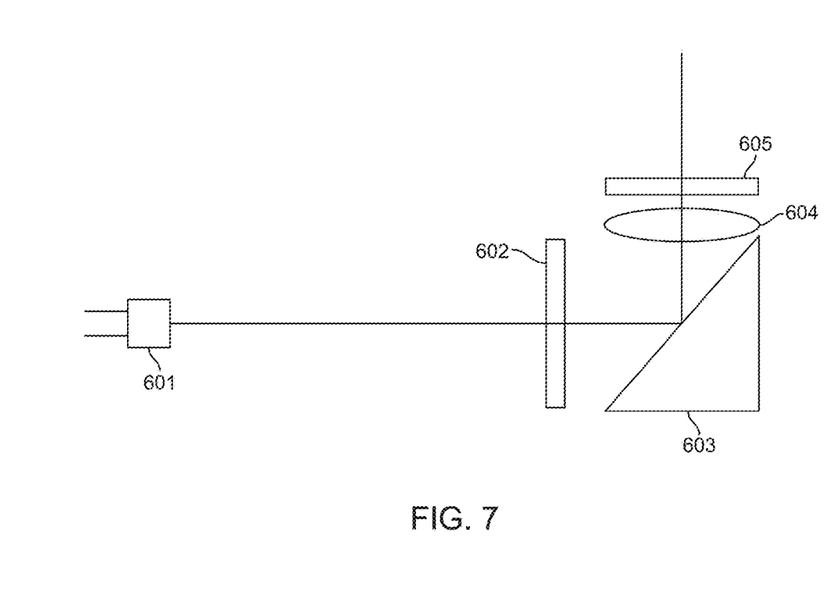
FIG. 7 is a diagram illustrating an alternate embodiment using a mirror between the DOE and the lens.

FIG. 7 is a diagram illustrating an alternate embodiment using a mirror between the DOE and the lens. An edge emitting laser 601 illuminates a DOE 602 (a hologram containing images of light dots). A prism mirror 603 reflects the laser beams that DOE 602 outputs, reflecting them upward towards an imaging lens 604. Lens 604 and multiple beam grating 605 are used to project an array of images into space above the unit.

Figure 8:
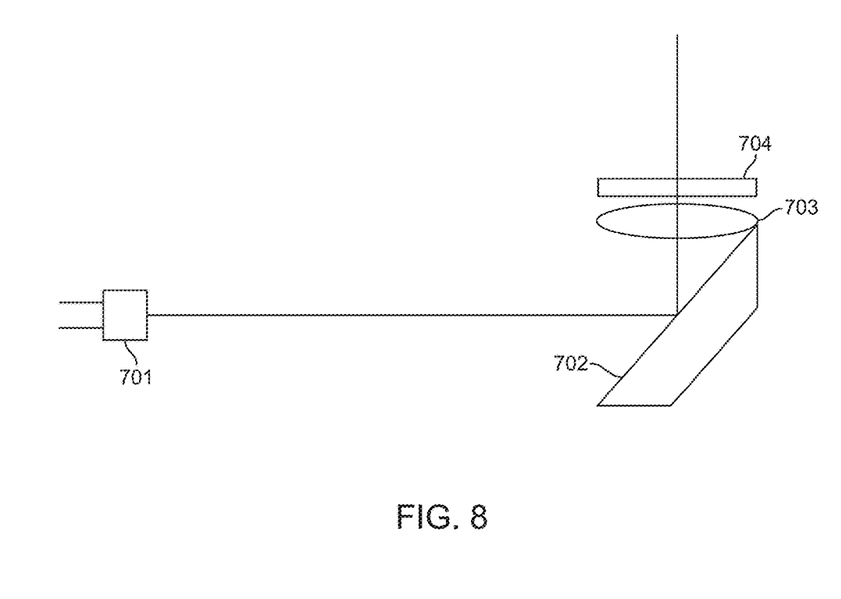
FIG. 8 is a diagram illustrating another alternate embodiment using a reflective DOE.

FIG. 8 is a diagram illustrating another alternate embodiment using a reflective DOE. In this embodiment, prism mirror 603 and DOE 602 of FIG. 7 are combined to provide a reflective DOE. Laser device 701 projects a beam onto a reflective hologram 702 containing images of light dots. The reflected and diffracted beams are provided to an imaging lens 703. A multiple beam grating 704 splits the image into multiple images.

Figure 9:
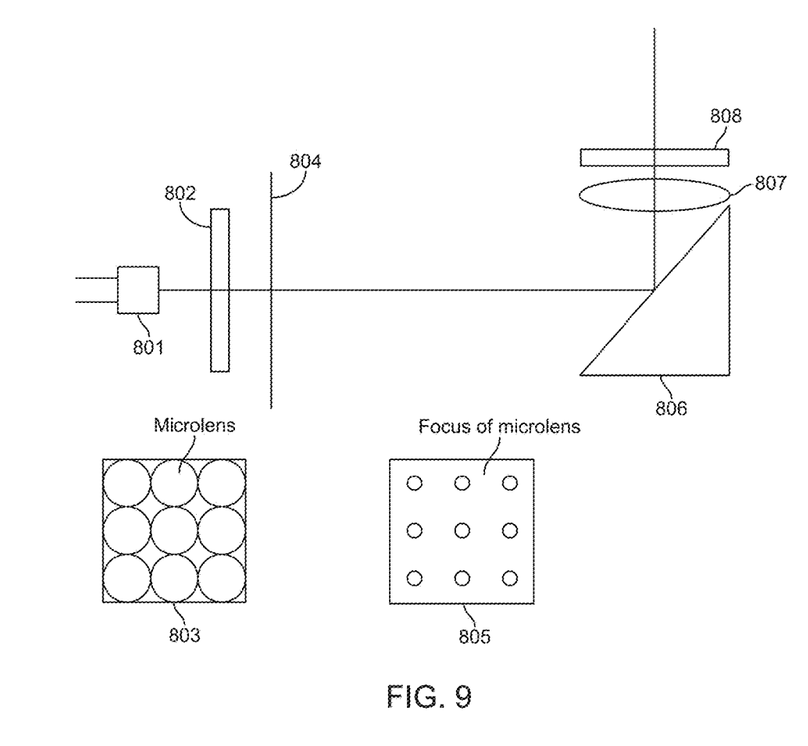
FIG. 9 is a diagram illustrating another alternate embodiment using an array of micro-lenses in place of a DOE.

FIG. 9 is a diagram illustrating another alternate embodiment using a micro-lens array in place of a DOE. In this embodiment the image of the dots is created by a micro-lens array 802 from a laser beam generated by laser emitter 801. The magnified front view 803 of the micro-lens array is shown. Plane 804 is the focal plane of the micro-lens array 802. The light dots illustrated at 805 are produced at the foci of the micro-lens (on plane 804). One dot is produce by each micro-lens. This array of dots is then reflected off prism mirror 806 and imaged by lens 807 through a multiple beam grating 808.

The construction of the DOE hologram is done by a Fourier transform hologram of the dot pattern. The construction of such a diffraction element is described, for example, in Wai-Hon Lee, Computer-Generated Holograms: Techniques and Applications, reprinted from Progress in Optics, 1978, and Wai-Hon Lee U.S. Pat. No. 7,699,516, the disclosures of which are hereby incorporated herein by reference. In general, the pattern of the dots pattern is recorded as a computer generated hologram (CGH). Suppose that the projected dot pattern is represented by a function f(x,y) and F(u,v) is its Fourier transform. The mathematical representation of the CGH is given by $$H(u,v)=\exp\{i\varphi(u,v)\} \qquad (1)$$

Where φ(u,v) is the phase of the complex function F(u,v). The amplitude function |F(u,v)| of the Fourier transform is assumed to be uniform enough and being ignore in the H(u,v). A laser recording device is then used to plot the function φ (u,v) on photoresist. The resulting CGH is the diffraction element which may be used in an embodiment of this invention. In one embodiment, the pattern-generating optical element is a holographic diffractive optical element with an on-axis 0 order beam.

For the embodiments of the present invention, a multiple beam grating is selected which will produce multiple beams of nearly the same intensity, which many multiple beam gratings will not do. One example of such a multiple beam grating is described in "High Efficiency Multiple Beams Gratings," Wai-Hon Lee, Applied Optics, Vol. 18, page 2152, Jul. 1, 1979. This article, the disclosure of which is hereby incorporated herein by reference, describes techniques for making a grating that can evenly divide an incident laser beams into multiple beams with equal intensities. In particular, a phase grating is used, with, for example, pulse width modulation (PWM) or pulse position modulation (PPM). The phase grating is created using either changes in the refractive index of the recording material or the optical thickness. The unique combination of such an equal intensity beam-splitter grating with the other elements described in the above embodiments produces the advantages of the present invention.

The optical thickness d needed to produce a 20 phase shift is related to θ as follows:

$$d(n-1)/\lambda = \theta/180°,$$

where λ is the wavelength of the illumination, and n is the refractive index of the recording material.

For λ=0.6328 μm and n=1.5, the optical thickness, d of 0.4404 μm to produce a θ of 63 degree.

In the above embodiments, the pattern of dots is produced by a DOE. In one embodiment, 1200 dots are produced by the DOE, with an array of about 37×37. A 5×5 array for the beam splitter is used to generate 25 copies of the image or pattern. With a 1200 dot array, this produces a 30,000 dot image. The diffraction angle to cover the 37×37 array of dots is about 12 degrees. Alternately, a smaller or larger number of dots may be produced. In one embodiment, the holographic DOE produces a pattern with an array of between 500-1500 dots and the beam-splitter has an array that generates 10-30 copies of the image or pattern.

To achieve a 30,000 dots hologram with a single DOE the diffraction angle would need to be about 35 degrees. The finest structure in a 10 degree hologram is more than 5 microns with today's technology, verses less than 2 microns for a 35 degree hologram. The etch depth today is about 2 microns. It is not possible to get 2 microns depth if the fringe spacing is less than 2 microns. That is the reason for the big 0th order in the 30,000 hologram or DOE. Thus, in order to minimize the 0th order, a 20 degree or less hologram should be used.

The various embodiments use a laser source with a divergent beam, without the need to collimate the beam as in other applications. For example, the beam may diverge with an aspect ratio of 2:1 or 3:1. In one embodiment, a 300 milliwatt laser is used, alternately a laser of any other power can be used depending on the sensitivity of the sensor.

In an alternate embodiment, a surface emitting laser can be used to replace the edge emitting lasers in the previous embodiments. In one embodiment, the laser is a vertical cavity surface emitting laser (VCSEL).

Figure 10:
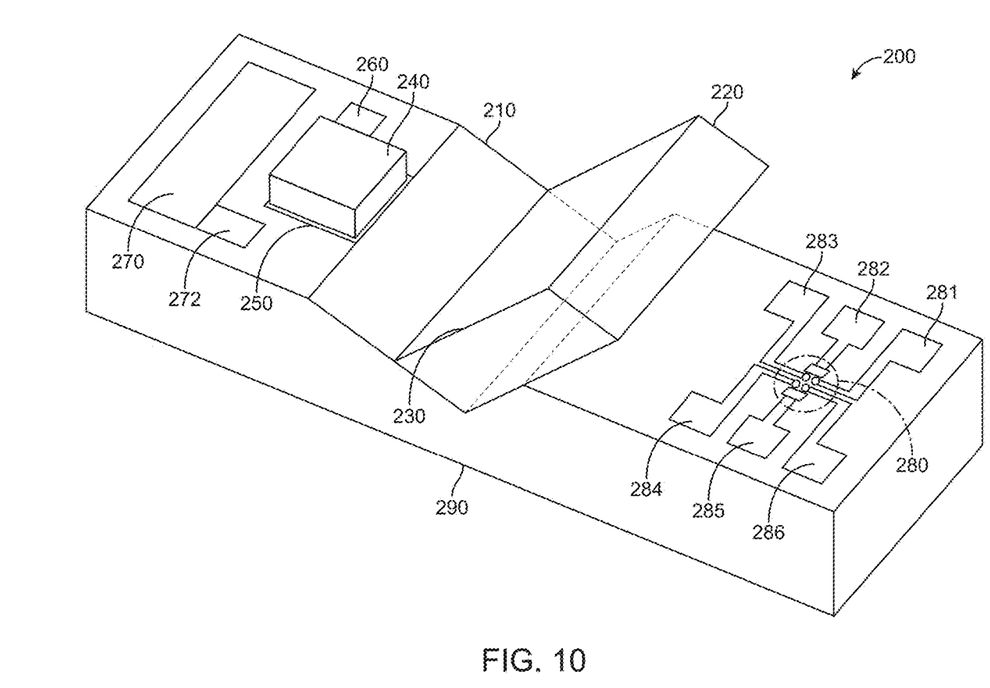
FIG. 10 shows an embodiment of a hybrid laser and photo detector module which can be used in one embodiment of the invention.

FIG. 10 shows an embodiment of a hybrid laser and photo detector module which can be adapted to be used in one embodiment of the invention, as shown in more detail in Wai-Hon Lee U.S. Pat. No. 6,188,062, the disclosure of which is hereby incorporated herein by reference. A photo detector device 200 is shown to have a V-shaped groove 210 etched on its surface. The photo detector is fabricated on a special silicon wafer which has a crystal plane subtending a 45 degree angle with respect to the surface of the wafer as shown in FIG. 2. A mirror 220 is attached to that 45 degree surface by means of adhesive or metallic bonding material such as thin solder. A corrugated structure with period T has been etched on top surface 230 of the mirror 220 to provide the DOE of FIG. 8.

The corrugated structure is designed to split the laser beam into the diffraction pattern. Laser chip 240 is attached to pad 250 on the photo detector by means of electrically conductive adhesive. A bonding pad 260 allows electrical connection be made to the bottom of the laser chip 240. A light sensitive area 270 behind the laser chip 240 is to detect the back light emission from the laser chip and thus serves as a laser power monitor. Pad 272 is for connecting to the anode of the detector element 270. On the back side of the mirror 220 is a set of photo detectors 280 which has six elements, a, b, c, d, e, and f in this embodiment. Additional detector elements can be implemented for multichannel readouts. Pads 281, 282, 283, 284, 285, 286 are respectively for the anodes of the detectors a, b, c, d, e, and f. The back surface of the detector 290 provide the contact to the cathode of all the light sensitive elements. Alternately, a single photodetector chip is used. The detector chip is separate from the projection module in one embodiment.

Figure 11:
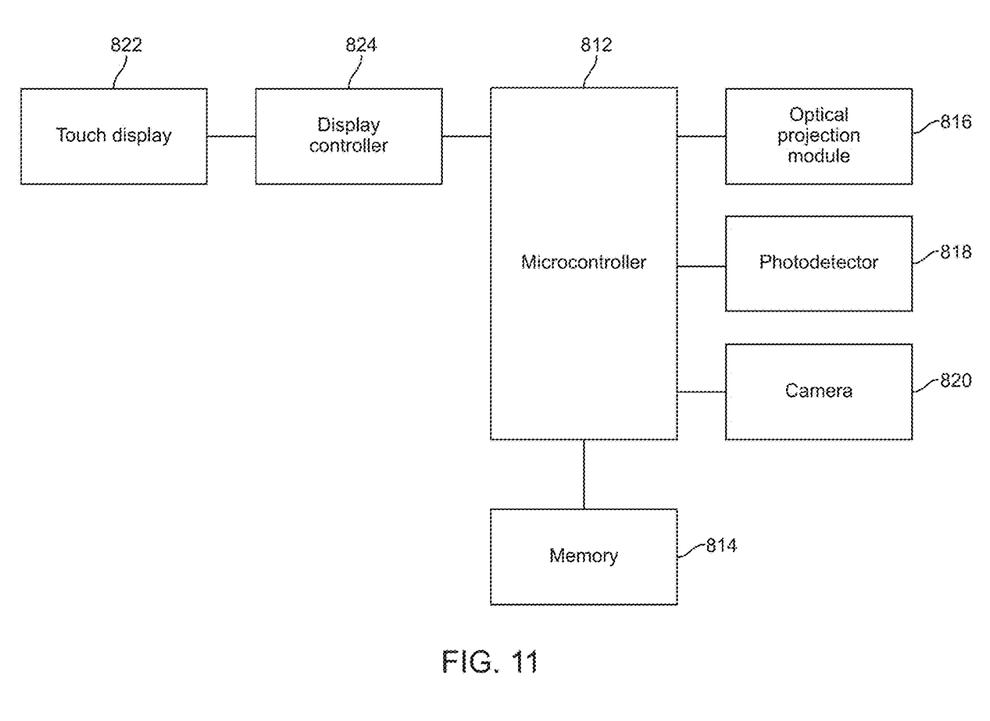
FIG. 11 is a block diagram of the components of a smartphone with an integrated optical projector in one embodiment of the invention.

FIG. 11 is a block diagram of the electronics of an embodiment of an electronic device such as smartphone device 10 of FIG. 1. A microcontroller 812, such as a microprocessor, controls the operation of the electronic device. A memory 814 contains the stored program for operating microcontroller 812, along with data storage. Memory 814 can be a flash or other solid state memory in one embodiment, and can be one or multiple memory chips.

A touch display 822 is controlled by a display controller 824, under the direction of microcontroller 812. The touch display provides both user inputs, and provides display information to the user. Optical projection module 816 may be one of the embodiments shown in the FIGS as described above. A separate photodetector 818 is shown, although it could be integrated into optical projection module 816. A camera 820 is also provided, and other components (not shown) may be included in the electronic device.

In one embodiment, the DOE is used in an electronic device, such as a smartphone, to measure the depth features of a person's face or to determine the distance of a person's face from a camera. A program in memory 814 controls microcontroller 812 to control camera 820 and optical projection module 816 to provide a composite image of a person's face. Calibration is done by recording the calibration positions of a plurality of elements of the diffraction pattern as reflected off a flat surface and detected by the photodetector. Then, the measured positions of a plurality of elements of the diffraction pattern as reflected off a non-flat object to be measured, such as a person's face, are recorded. Then, the differences between the calibrated and measured positions are determined. From those differences, the change in depth can be determined. That information is used to generate a map of the depth of the non-flat object at different points.

In one embodiment, the method for determining depth using the diffraction pattern is set forth in Prime Sense US Published Application No. 20100007717, the disclosure of which is hereby incorporated herein by reference. Additional details of one embodiment are set forth in PCT Publication WO 2007/043036, which describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT Publication WO 2007/105205. The disclosures of PCT Publication WO 2007/043036 and PCT Publication WO 2007/105205 are hereby incorporated herein by reference.

In one embodiment, a program in memory 814 controls microcontroller 812 to combine images from camera 820 with depth information from optical projection module 816 to provide a composite image of a person's face. Facial recognition software can then compare the face to stored faces, either in the device or in the cloud. Such comparison can be used, for example, to authenticate a person as authorized to operate the electronic device or a program on the device. Alternately, it can be used to match a person to a face detected on a social media platform or other platform or application.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. An optical projector comprising:
    a laser configured to produce a laser beam with a divergent beam;
    a pattern-generating holographic diffractive optical element mounted to intercept the laser beam, without an intermediate collimation, and configured to generate a pattern from the laser beam, which forms a virtual image at a plane before the holographic diffractive optical element;
    a multiple beam grating (MBG) configured to duplicate the pattern multiple times to provide a multiple pattern image; and
    a lens mounted between the pattern-generating holographic diffractive optical element and the MBG to project the pattern.

2. The optical projector of claim 1 further comprising an angled mirror mounted to change the path direction of the pattern.

3. The optical projector of claim 2 wherein the pattern-generating optical element is combined with the angled mirror to provide a DOE on the angled mirror as a reflective DOE.

4. The optical projector of claim 1 wherein the MBG evenly divides the pattern into multiple patterns with equal intensities.

5. The optical projector of claim 1 wherein the holographic diffractive optical element has a diffraction angle of 20 degrees or less.

6. The optical projector of claim 1 wherein the multiple beam grating (MBG) is constructed with a phase grating using one of pulse width modulation (PWM) or pulse position modulation (PPM).

7. The optical projector of claim 6 wherein the phase grating is created using either changes in the refractive index of a recording material or an optical thickness.

8. The optical projector of claim 1 wherein the pattern-generating holographic diffractive optical element has an on-axis 0 order beam.

9. The optical projector of claim 1 wherein the pattern-generating holographic diffractive optical element produces a pattern of an array of between 500-1500 dots and the multiple beam grating (MBG) has an array that generates 10-30 copies of the image or pattern.

10. The optical projector of claim 1 wherein the laser is a vertical cavity surface emitting laser (VCSEL).

11. A method for optical projection comprising:
    producing a single laser beam that is a divergent beam;
    intercepting the laser beam and generating a pattern as a holographic virtual image from the laser beam using a holographic diffractive optical element, without an intermediate collimation, which forms a virtual image at a plane before the holographic diffractive optical element, wherein the holographic diffractive optical element has a diffraction angle of 20 degrees or less;
    projecting the pattern with a lens; and
    duplicating the pattern multiple times with a multiple beam grating (MBG) to provide a multiple pattern image.

12. The method of claim 11 further comprising:
    changing the path direction of the pattern.

13. The method of claim 11 wherein the MBG evenly divides the pattern into multiple patterns with equal intensities.

14. The method of claim 11 further comprising:
    beam-splitting the pattern to duplicate the pattern, using a phase grating with one of pulse width modulation (PWM) or pulse position modulation (PPM), using either changes in the refractive index of a recording material or an optical thickness.

15. An electronic device comprising:
    an optical projector module including:
        a laser configured to produce a laser beam that is a divergent beam,
        a pattern-generating holographic diffractive optical element mounted to intercept the laser beam and configured to generate a pattern as a holographic virtual image from the laser beam, without an intermediate collimation, which forms a virtual image at a plane before the holographic diffractive optical element, wherein the holographic diffractive optical element has a diffraction angle of 20 degrees or less,
        a lens mounted to project the pattern,
        a multiple beam grating (MBG) configured to duplicate the pattern multiple times to provide a multiple pattern image, and
        a photodetector,
        wherein the lens is mounted between the pattern-generating holographic diffractive optical element and the MBG;
    a microprocessor;
    a memory containing non-transitory computer readable media programmed to:
        record the first positions of a plurality of elements of the pattern as reflected off a flat surface and detected by the photodetector;
        record the second positions of a plurality of elements of the pattern as reflected of a non-flat object to be measured;
        determine the difference between the first and second positions for the plurality of elements of the pattern as reflected; and
        generate a map of the depth of the non-flat object at different points based on the difference between the first and second positions for the plurality of elements of the pattern as reflected.

16. The electronic device of claim 15 wherein the multiple beam grating (MBG) is constructed with a phase grating using one of pulse width modulation (PWM) or pulse position modulation (PPM), and wherein the MBG evenly divides the pattern into multiple patterns with equal intensities and has a diffraction angle of 20 degrees or less.

17. The electronic device of claim 16 wherein the phase grating is created using either changes in the refractive index of a recording material or an optical thickness.

18. The electronic device of claim 15 wherein the holographic diffractive pattern-generating optical element has an on-axis 0 order beam.

19. The electronic device of claim 15 wherein the pattern-generating holographic diffractive optical element produces a pattern of an array of between 500-1500 dots and the multiple beam grating (MBG) has an array that generates 10-30 copies of the image or pattern.

20. The electronic device of claim 15 wherein the electronic device is a smartphone.

* * * * *